United States Patent
Poton et al.

(10) Patent No.: US 10,752,216 B2
(45) Date of Patent: Aug. 25, 2020

(54) END CAP FOR A WIPER

(71) Applicant: Valeo Systèmes d'Essuyage, Le Mesnil Saint Denis (FR)

(72) Inventors: Eric Poton, Pont du Chateau (FR); Stéphane Houssat, Blanzat (FR); Vincent Gaucher, Ennezat (FR); Olivier Jomard, Aubiere (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 243 days.

(21) Appl. No.: 15/097,323

(22) Filed: Apr. 13, 2016

(65) Prior Publication Data

US 2016/0304060 A1    Oct. 20, 2016

(30) Foreign Application Priority Data

Apr. 14, 2015 (FR) .................................. 15 53225

(51) Int. Cl.
  *B60S 1/38* (2006.01)
(52) U.S. Cl.
  CPC ........... *B60S 1/3891* (2013.01); *B60S 1/3874* (2013.01); *B60S 1/3889* (2013.01)
(58) Field of Classification Search
  CPC ............................. B60S 1/3889; B60S 1/3891
  See application file for complete search history.

(56) References Cited

U.S. PATENT DOCUMENTS

| 8,857,009 B2 | 10/2014 | Thielen et al. | |
| 2010/0319154 A1* | 12/2010 | Bousset | B60S 1/3889 15/250.48 |
| 2012/0124767 A1 | 5/2012 | Thielen et al. | |

FOREIGN PATENT DOCUMENTS

| CN | 102083660 A | 6/2011 |
| DE | 202004012109 U1 | 9/2004 |
| EP | 2193963 A1 | 6/2010 |
| EP | 2821300 A1 | 1/2015 |
| FR | 2905650 A1 | 3/2008 |
| FR | 2922502 A1 | 4/2009 |
| WO | 2014/079488 A1 | 5/2014 |

OTHER PUBLICATIONS

Search Report Issued in Corresponding French Application No. 1553225, dated Mar. 9, 2016 (8 Pages).
The First Office Action issued in corresponding Chinese Application No. 201610231570.0, dated Nov. 27, 2019 (13 pages).

* cited by examiner

*Primary Examiner* — Andrew A Horton
(74) *Attorney, Agent, or Firm* — Osha Liang LLP

(57) ABSTRACT

An end cap for a wiper of a window of a vehicle having at least one flexible supporting element and a blade design to be applied against the window is disclosed. The end cap includes a housing for receiving an end portion of the flexible supporting element. The end cap also has at least one means for locking the end portion of the flexible supporting element in an engaged position in the housing, and an outer wall delimiting the cap as well as an access orifice to the locking means, the locking means including a portion forming a longitudinal stop facing the flexible supporting element, a first face extending between the housing and the outer wall and a second face opposite the orifice. The locking means include an element that emerges at the junction between the first face and the portion and that extends at least longitudinally beyond the portion.

15 Claims, 4 Drawing Sheets

END CAP FOR A WIPER

The domain of the present invention is wipers used in motor vehicles. The invention specifically relates to a cap assembled on the end of a wiper as well as a method for assembling such a cap. The invention also relates to a wiper and a wiping system incorporating such a wiper.

Motor vehicles are commonly fitted with wiper systems to wipe and wash the windscreen and to prevent drivers' vision of the surrounding environment from being disturbed. These windscreen wipers are conventionally driven by an arm effecting an angular to-and-fro movement, and may include elongated wipers which in turn carry scraper blades made of an elastic material. These blades rub against the windscreen and move the water out of the driver's field of vision. The wipers are either made of articulated beams that hold the scraper blades at several different points (in a conventional version) or of a semi-rigid assembly that holds the scraper blade along the entire length of same (in a more recent version referred to as flat blade). In this second solution, the wiper is attached to the turning arm of the windscreen wiper by an assembly comprising a mechanical connector and an adaptor. The mechanical connector is a component crimped directly onto the flat wiper, and the adaptor is an intermediate component that enables the connector to be attached to the windscreen wiper arm.

U.S. Pat. No. 8,857,009B2 discloses a wiper fitted with an end cap according to the preamble of Claim 1. The end cap disclosed in this document presents numerous drawbacks.

Firstly, the locking means can be actuated accidentally, which under certain circumstances may cause the cap to become detached from the wiper. Although access to the locking means is hindered, the locking means are not actually prevented from moving.

Secondly, the mechanical link between the securing means and the supporting element of the wiper is not sufficiently robust. The level of security of this mechanical link could advantageously be improved.

The purpose of the present invention is therefore to overcome the drawbacks described above by means of an end cap or a wiper that includes a device that secures the attachment of the locking means in relation to the flexible supporting element making up the wiper.

The invention therefore relates to an end cap for a wiper of a window of a vehicle having at least one flexible supporting element as well as a blade design to be applied against the window, the cap having a housing designed to receive an end portion of the supporting element, the cap having at least one means for locking the end portion of the supporting element in an engaged position in the seat, the end cap having an outer wall delimiting the cap as well as an access orifice to the locking means, the locking means including a portion able to form a longitudinal stop facing the flexible supporting element, a first face extending between the housing and the outer wall and a second face opposite the orifice, characterized in that the locking means include an element that emerges at the junction between the first face and the portion and that extends at least longitudinally beyond the portion. The element is designed to block the locking means and thereby prevent an accidental movement from detaching the cap from the end portion of the flexible supporting element.

According to one example of the invention, the element forms an edge arranged to come into contact with at least one longitudinal face of the supporting element. The mechanical bearing of the edge against a face of the supporting element prevents the locking means from moving in at least one direction of movement of the locking means.

The edge thus arranged may be delimited by a surface perpendicular or substantially perpendicular to a face of the portion. Such an arrangement cooperates perfectly with an edge formed at the junction of the face of the supporting element and of the section delimiting a cavity formed in the supporting element, and which receives the locking means.

According to another example of the invention, the locking means include an elastic arm at the end of which are formed the portion and the element. The arm is deemed to be elastic in as much as it can move within a limit guaranteeing that the arm returns to the initial position of same. By way of example, the arm is made of a flexible polymer, in particular moulded simultaneously with the end cap.

It will be seen that the elastic arm may include a zone on which at least one bevel is formed. Such a bevel facilitates insertion of the locking means into the cavity in the supporting element.

Optionally, the elastic arm extends in a first direction and the zone extends in a second direction, the first direction and the second direction being substantially parallel and distinct. It is understood here that the bevel is arranged preferably on the side of the elastic arm. Such a solution helps to reduce the size of the cap, in particular the length of same.

The device according to the invention may include the elastic arm moveable in rotation about an axis that extends substantially parallel to a plane in which most of the housing extends and perpendicular to a longitudinal direction of the cap. It is understood here that the arm moves in a direction that passes over two longitudinal faces of the flexible supporting element.

The locking means may form an "L" shape in a plane substantially parallel to a plane in which most of the housing extends. One branch of the "L" is formed by the elastic arm while the other branch of the "L" is formed by the bevel.

The invention also relates to a wiper including at least one flexible supporting element as well as a blade designed to be applied against the window, and one end cap having a housing designed to receive an end portion of the supporting element, said cap having at least one means for locking the end portion of the supporting element in an engaged position in the housing by cooperation between the locking means and a cavity formed in the supporting element, characterized in that the end cap includes a securing device for the locking means that prevents the locking means from coming out of the cavity.

The securing device is designed to block a movement of the locking means in one of the directions corresponding to the direction of movement of the locking means.

According to one embodiment, the securing device limits movement of the locking means to prevent same from coming out of the cavity, once the locking means have been seated in the cavity. According to another alternative or complementary embodiment, the securing device blocks access to the locking means.

Optionally, the securing device includes an element that comes into contact with at least one longitudinal face of the supporting element, said longitudinal face being opposite an outer wall delimiting the end cap.

According to the invention, the locking means may include a portion forming an longitudinal stop bearing against the inside of the cavity, a first face that extends between the housing and the outer wall, a second face opposite an access orifice to the locking means, the element emerging from the junction between the first face and the portion and extending at least longitudinally beyond the portion.

According to an example embodiment of the invention, the element forms an edge delimited by a surface substantially perpendicular to a face of the portion.

It will be noted that the locking means include an elastic arm at the end of which are formed a portion forming a longitudinal stop bearing against the inside of the cavity and the securing device.

According to an example embodiment, the elastic arm includes a zone on which at least one bevel is formed.

The elastic arm extends in a first direction and the zone extends in a second direction, the first direction and the second direction being substantially parallel and distinct.

According to another embodiment, the securing device includes a leg coming out of a body of the cap and covering the locking means. This is an alternative embodiment of the element forming the securing device. The invention also covers the securing device being formed both by the element that comes into contact with at least one face of the flexible supporting element extending longitudinally and by the leg that covers the locking means. In either case, the leg emerges from the body of the cap, in particular by being moulded simultaneously with same, and is designed to be folded over the top, i.e. opposite the securing means, thereby performing the function allotted to the securing device.

In this case, the leg may include a fold at the edge of two portions, each of which extends along globally concurrent planes. According to an example embodiment, a first portion emerging from the body is delimited by the fold, this latter creating a second portion that extends in a plane perpendicular or substantially perpendicular to a plane extending the first portion.

According to a unique variant embodiment or an embodiment that complements the two embodiments of the securing device described above, the securing device may be formed by at least one wall that runs alongside a peripheral edge of the locking means.

The invention also relates to a wiping system for a window of a vehicle having a drive arm and a blade incorporating any one of the features listed above.

The invention also relates to a method for assembling a wiper having at least one flexible supporting element and at least one component attached to the supporting element, and an end cap having a housing designed to receive an end portion of the supporting element, said cap having at least one means for locking the end portion of the supporting element in an engaged position in the housing by cooperation between the locking means and a cavity formed in the supporting element, said cap having a securing device for the locking means, in which method the cap is slipped onto the end portion of the supporting element until the component is stressed longitudinally, causing the securing device to enter the cavity. This stress is required to enable the securing device to enter the cavity so that same can be positioned on the supporting element, preventing accidental actuation of the locking means.

According to a supplementary step of this method, the stress is released, causing an element of the securing device to come into contact with at least one longitudinal face of the flexible supporting element.

As an alternative or complement to the method provided for above, a method for assembling a wiper may be provided with at least one flexible supporting element and at least one component attached to the supporting element, and an end cap having a housing designed to receive an end portion of the supporting element, said cap having at least one means for locking the end portion of the supporting element in an engaged position in the seat, said cap having a securing device for the locking means, in which method the cap is slipped onto the end portion of the supporting element until the locking means cooperates with a cavity formed in the supporting element, then the securing device, notably at least one leg, coming from a body of the cap is deformed until the securing device covers the locking means. Such a method requires an additional operation to positively check that the locking means are properly prevented from moving.

A first advantage of the invention lies in the impossibility of unlocking the locking means accidentally. This significantly increases the level of security of the assembly of the cap on the end of the wiper. The various components making up the wiper, such as the air deflector or air deflectors, are therefore impossible to remove from the wiper without damaging same.

Furthermore, the invention provides improved assembly safety compared to the device in the prior art. It also overcomes issues relating to manufacturing tolerances and assembly of the locking means. Finally, the invention makes it possible to improve overall quality control on the wiper assembly line.

Other features, details and advantages of the invention are set out more clearly in the description given below by way of example and in relation to the drawings, in which.

It should first be noted that the figures show the invention in detail to enable the invention to be carried out, and these figures may naturally be used to better define the invention where appropriate.

In the remainder of the description, the terms longitudinal or lateral, above, below, front and rear shall refer to the orientation of the wiper or of the end cap according to the invention. The longitudinal direction corresponds to the main axis of the wiper along which it extends, while the lateral orientations correspond to the convergent straight lines, i.e. lines crossing the longitudinal direction, notably perpendicular to the longitudinal axis of the wiper in the plane of rotation of same. For the longitudinal directions, the terms outside or inside shall be understood in relation to the attachment point of the wiper on the rotational drive arm of said wiper, the term inside corresponding to the portion in which the arm and one half-wiper extend. Finally, the directions referred to as upper and lower correspond to orientations perpendicular to the plane of rotation of the wiper, the term lower containing the plane of the windscreen.

Figure 1:
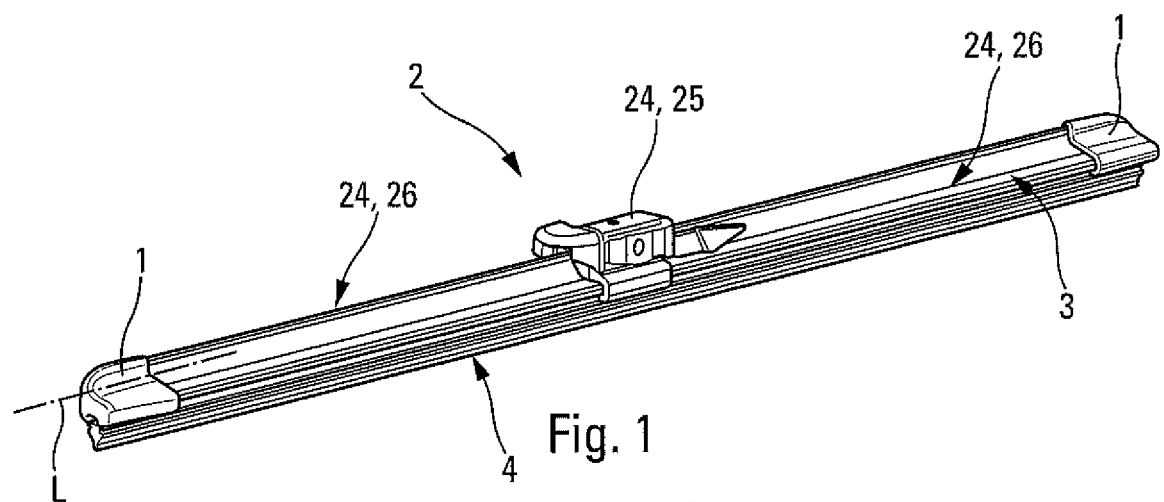
FIG. 1 is a perspective overview of a wiper according to the invention.

Firstly, FIG. 1 shows the wiper 2 according to the invention. Such a wiper 2 is used to scrape a window of the vehicle and move the water deposited on said window out of the field of vision of a driver. The wiper 2 is made up of at least one flexible supporting element 3, a component 24, a wiper blade 4 and at least one, and possibly two, end caps 1 installed on each end portion of the flexible supporting element 3. The flexible supporting element 3 is a longitudinal supporting element.

The flexible supporting element 3 may be a single flat elastic metal strip. According to an alternative, the flexible supporting element 3 may be formed by two elastic metal strips each seated in a slot formed on either side of the blade 4. In both cases above, in an idle state, such a metal strip is curved along a plane perpendicular to a longitudinal direction of the strip. The function of such a metal strip, whether it be single or double, is to distribute the bearing forces along the blade 4 that are generated by connection means 25 attached to the flexible supporting element at the longitudinal centre of the wiper 2.

The component 24 refers to several types of constituent parts of the wiper 2. It may be connection means 25 designed to link the wiper to a rotational drive arm of said wiper. It may also be one or more air deflector 26 is attached to the flexible supporting element 3 the function of which is to transform the air stream passing over the wiper into a bearing force that presses the blade 4 against the window.

The wiper 2 also includes two identical end caps 1, as described below with reference to FIGS. 2 to 8.

Figure 2:
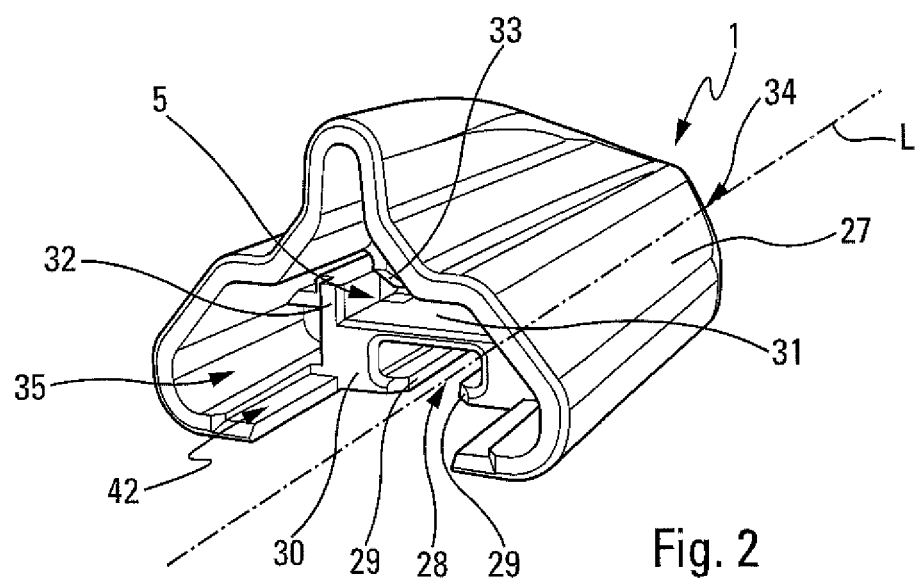
FIG. 2 is a perspective view of an end cap according to the invention.
Figure 3:
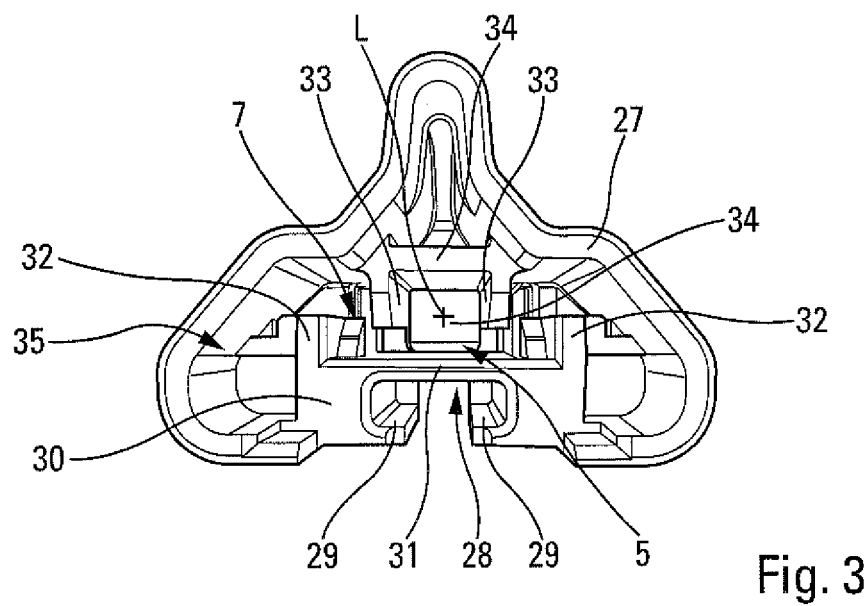
FIG. 3 is a front perspective view of the end cap in FIG. 2.

FIGS. 2 and 3 are perspective views of the end cap 1. The function of such an end cap 1 is to mechanically hold the components making up the wiper 2. This end cap 1 also has an aesthetic function since it neatly covers and thereby conceals the end of the blade 4, the end of the flexible supporting element 3 and the end of the components 24, notably the air deflector 26.

The end cap 1 has an outer wall 27 that globally matches the outer profile of the air deflector 26. Inside an internal volume 42 delimited by the outer wall 27, the end cap 1 has a housing 5 for receiving the end portion of the flexible supporting element, not shown in this figure. The end cap 1 also has a slot 28 that is designed to mechanically retain a heel of the blades 4. Such a slot 28 is formed in a body 30 of the end cap 1, in particular in a lower portion of said body. This slot 28 opens outwards, this opening being delimited by two hooks 29 that extend longitudinally along the end cap 1.

The housing 5 is formed in the body 30 of the end cap, between the slot 28 and the outer wall 27, considered along a direction perpendicular to a plane extending the slot 28. The housing 5 is delimited by a back wall 31 and at least two lateral edges 32, as well as by at least one flank 33, and notably two flanks 33. These flanks 33 are each formed by a rib formed in the outer wall 27. These flanks 33 are links to one another by a material bridge 34. The flanks 33 extend in planes perpendicular to a plane in which the back wall 31 extends, and are thus parallel to the planes extending the lateral edges 32.

The end cap 1 includes a rear portion 41 that closes the internal volume 42 of the cap using the outer wall 27. At the end opposite the housing 5 in the longitudinal direction L, the end cap 1 is open and the outer wall 27 delimits a receiving zone 35. This latter notably receives at least one of the components of the wiper, and for example an extremity of the air deflector that is seated in the receiving zone 35.

The end cap 1 also includes locking means 7 shown in FIG. 3. These locking means are intended to hold the end cap 1 on the wiper in the longitudinal direction to prevent same from coming out of the wiper in the longitudinal direction of same. These locking means 7 are for example a tooth designed to sit in a cavity formed on or in the flexible supporting element.

Figure 4:
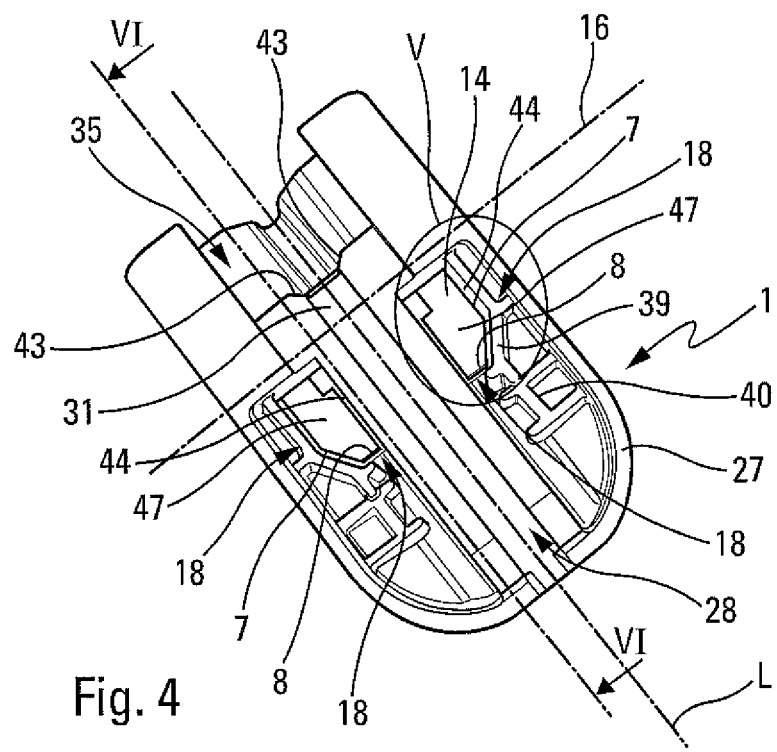
FIG. 4 is a bottom perspective view of the end cap in FIG. 2.

FIGS. 4 to 7 show these locking means 7 in greater detail. In FIG. 4, the end cap 1 is shown from below, the slot 28 and the receiving zone 35 thus opening out towards a lower face of the end cap 1.

The locking means 7 include an elastic arm 14 that emerges from the body of the end cap 1. This elastic arm 14, also referred to as a flexible tab, moves in rotation about an axis 16. This latter is parallel or substantially parallel to a plane in which the housing receiving the end portion of the flexible supporting element extends. This axis 16 is also perpendicular or substantially perpendicular to the longitudinal direction L of the end cap 1. It can be seen here that the elastic arm moves either towards an access orifice 44 formed in the lower face of the end cap 1, or towards the outer wall 27 of same. Using alternative references, the elastic arm 14 can be understood to move either towards the blade 4 of the wiper 2, or towards the top of the air deflector 26 (FIG. 1) about a hinge formed by the axis 16.

The locking means 7 include a portion 8 able to form a longitudinal stop facing the flexible supporting element. When the end cap 1 is slipped onto the end portion of the flexible supporting element, this portion 8 cooperates with a cavity formed in the supporting element such as to block, in one direction, the longitudinal movement between the end cap 1 and the wiper. This portion 8 also bears against a section of the flexible supporting element that delimits the cavity.

The locking means 7 are also delimited by a first face 46 (FIG. 7) that extends between the housing 5 and the outer wall 27. It can be seen here that this first face 46 extends beyond the housing 5 towards the outer wall 27 delimiting the end cap 1. The locking means 7 are also delimited by a second face 47 opposite the access orifice 44. In other words, this second face is visible from outside the cap when same is observed from below.

The locking means 7 form an L-shaped profile, when seen in a plane substantially parallel to a plane in which most of the housing 5 extends, one branch of the "L" extending parallel to the longitudinal direction L of the end cap 1 while a second branch of the "L" extends perpendicular to the longitudinal direction L of the end cap 1, or in other words parallel to the axis 16.

FIG. 4 shows two locking means 7 formed symmetrically in relation to a median longitudinal plane passing notably through the top of the cap. At least one of these locking means, and possibly both, include a securing device 18. The function of this securing device 18 is to limit the travel, also referred to as movement, of the locking means 7 in at least one of the directions of movement of same when assembling the end cap 1 on the end portion of the flexible supporting element. This limits the risk of accidental actuation and prevents detachment from the wiper.

Furthermore, as illustrated in FIG. 4, each hook 29 preferably has a bevelled free extremity 43 to facilitate positioning of the slot 28 about a heel of the blade, when the end cap 1 is slipped on the end portion 6 of the flexible supporting element 3.

Level with the end cap 1, the securing device 18 takes the form of an element 9, formed on the locking means 7 and extending at least longitudinally to one free extremity of the locking means 7 and/or of the elastic arm 14. The element 9 emerges from the junction between the first face 46 and the portion 8, more specifically level with a face 13 forming the portion 8. Said junction is substantially in the zone where an edge would be formed between the face 46 and the portion 8 in the absence of the element 9.

Figure 5:
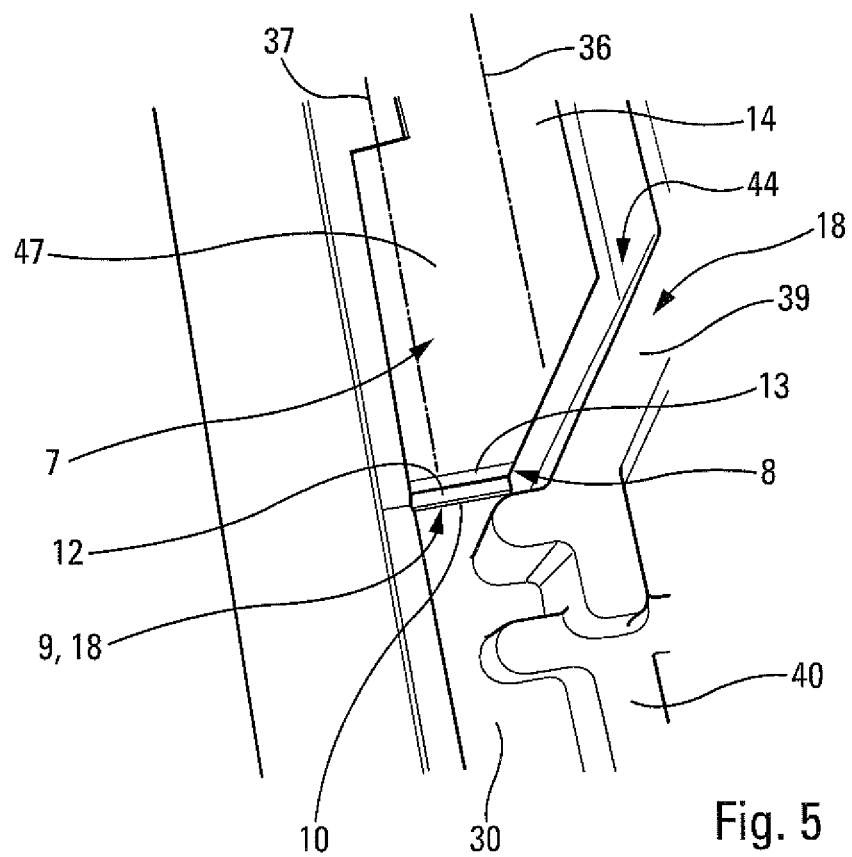
FIG. 5 is a magnification of detail V in FIG. 4.

FIG. 5 shows the detail indicated using reference sign V in FIG. 4 illustrating an example embodiment of the securing device 18 according to the invention. This for example takes the form of an element 9 that extends beyond the portion 8. In other words, the element 9 extends beyond the portion 8 in the direction of the longitudinal axis L towards the closed portion of the end cap 1. The element 9 forms for example an edge 10 arranged to come into contact with at least one longitudinal face of the flexible supporting element, i.e. one of the large faces that determine the flat strip shape of the flexible supporting element.

It can be seen that the edge 10 is delimited by a surface 12 that is substantially perpendicular to a face 13 of the portion 8. The face 13 is the face that comes into contact with the section of the cavity formed in the flexible supporting element, while the surface 12 is the surface that comes into contact with the longitudinal face of the flexible supporting element, thereby preventing movement of the elastic arm 14.

FIG. 5 also shows the lateral offsetting between the elastic arm and a bevel 15, facilitating insertion of the locking means. The portion 8 and the securing device 18, notably the element 9, are formed at the end of the elastic arm 14. The elastic arm 14 includes a zone on which is formed at least one bevel 15. This bevel 15 triggers a movement of the elastic arm enabling the locking means 7 to be retracted during assembly of the end cap 1 on the end portion of the flexible supporting element.

Figure 6:
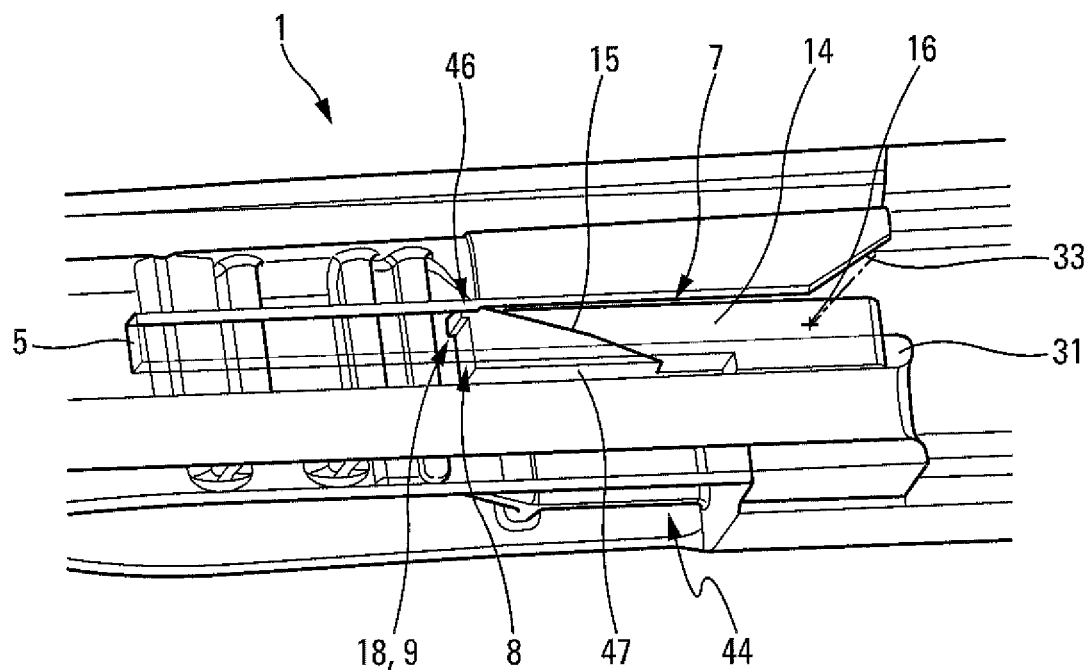
FIG. 6 is a cross-section along the line VI-VI in FIG. 4, where the walls cut away are shown transparently.

FIG. 6 shows a section of the end cap 1 in which the cutaway walls have been deliberately shown transparently to reveal the features found behind these walls. According to an example embodiment, FIG. 6 shows how the bevel 15 and the elastic arm 14 are offset laterally in relation to one another. FIG. 5 shows a first direction 36 that corresponds to a longitudinal direction extending the elastic arm 14, and a second direction 37 that corresponds to a longitudinal direction extending the bevel 15. This first direction 36 and this second direction 37 are distinct, and notably substantially parallel.

It can be seen that the securing device 18 straddles a portion delimited by the bevel 15 and a portion delimited by the elastic arm 14.

Figure 7:
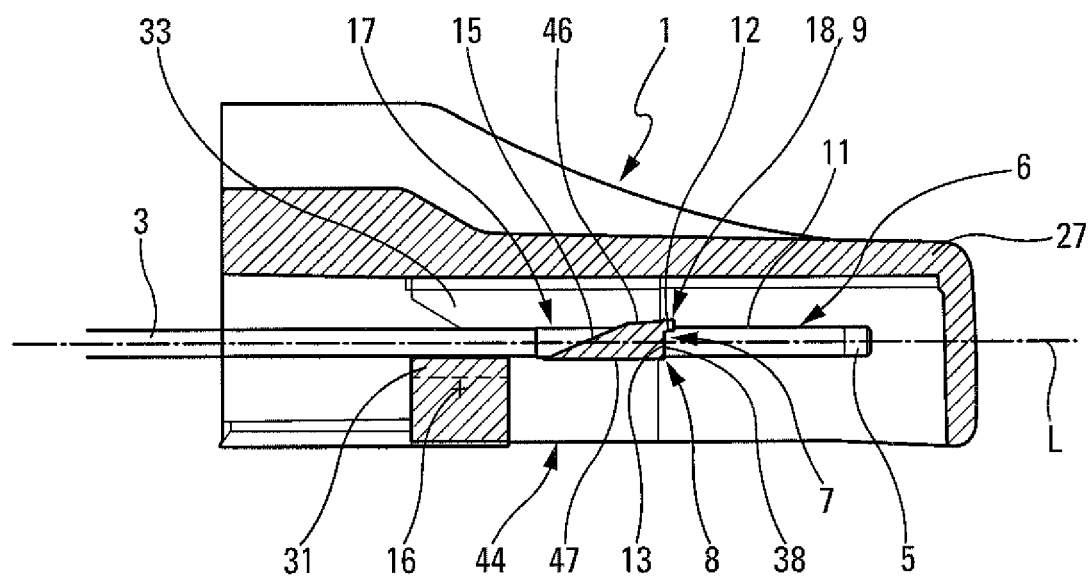
FIG. 7 is a cross-section of the end cap in FIG. 2 shown on a flexible is supporting element making up a wiper.

FIG. 7 shows the cooperation between the locking means 7, the securing device 18 and the flexible supporting element 3. The housing 5 receives the end portion 6 of the flexible supporting element 3 between the back wall 31 and the ribs 33. Moreover, at least one cavity 17 is formed in this end portion 6. This cavity 17 extends across the entire width of the end portion. According to an example embodiment, the cavity forms a hole surrounded by the end portion. Alternatively, the cavity 17 may take the form of a notch formed on the edge of the end portion 6 of the flexible supporting element 3.

As mentioned above, the face 13 of the portion 8 is in contact with a section 38 of the cavity 17, which enables implementation of the locking means 7. The securing device 18 for these locking means becomes active as soon as the surface 12 comes into contact with the longitudinal face 11 of the flexible supporting element 3. The elastic arm 14, which cannot be seen in this figure on account of the offsetting of same with the bevel 15, turns about the axis 16.

Figure 8:
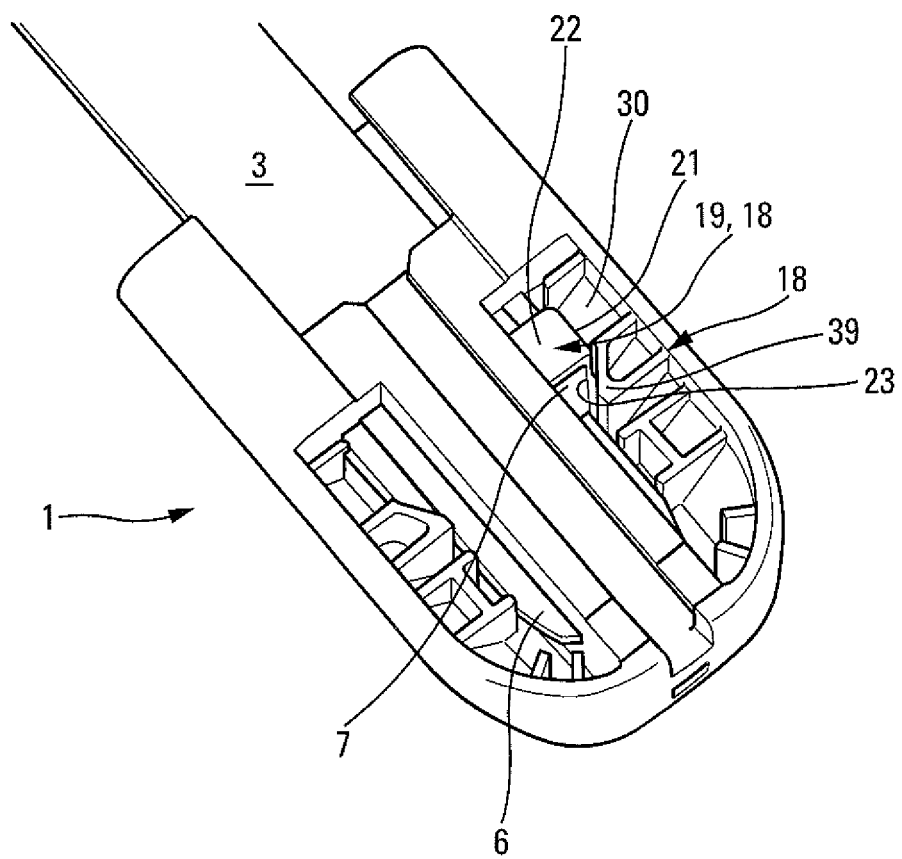
FIG. 8 is a bottom perspective view of an end cap according to an alternative embodiment.

FIG. 8 shows a variant embodiment of the securing device, which may be used on its own, i.e. instead of the element 9, or in combination with same, in order to increase the level of security of the locking means. The securing device 18 in this case takes the form of a leg 19 coming out of the body 30 of the end cap 1. This leg 19 is moulded simultaneously with the rest of the end cap 1 and can be folded after insertion of the end portion 6 of the flexible supporting element 3. The leg 19 thus includes a fold 21 at the edge of two portions 22 and 23, each of which extends along globally concurrent planes, for example perpendicular planes. The locking means 7 are secured as soon as the securing device 18 covers the elastic arm of the locking means 7, thereby making same inaccessible.

Another embodiment of the securing device 18 is shown in FIGS. 4, 5 and 8. As in the above embodiment, this embodiment of the securing device 18 may be used on its own, i.e. instead of the element 9 and/or the leg 19, or in combination with either or both of these parts.

The securing device 18 takes the form of at least one wall 39 formed in the body 30 of the end cap 1. FIGS. 4 and 5 show how the wall 39 is formed laterally in relation to the locking means 7, i.e. on the side of same. The wall 39 extends perpendicular in relation to the plane extending the housing 5. In the example in FIGS. 4 and 5, the wall 39 follows the profile of the elastic arm 14 on three sides of same, i.e. along the peripheral edge of same. In the variant in FIG. 8, the portion 23 of the leg 19 described above forms a portion of the wall 39. The wall 39 is thus in the immediate proximity of the locking means 7, thereby preventing anyone wishing to actuate the elastic arm 14 from inserting a tool therein.

The end cap 1 also includes a set of reinforcements 40 formed in the body 30 inside the volume delimited by the outer wall 27.

The methods for assembling a wiper fitted with an end cap are described below.

According to a first method, the wiper 2 includes at least one flexible supporting element 3 and at least one component 24 attached to the flexible supporting element 3. According to an example embodiment, the component 24 may be one or more air deflector 26 or one connection means 25 designed to mechanically link the wiper 2 to a rotational drive arm. The wiper 2 used in this method also includes an end cap 1 with a housing 5 that receives the end portion 6 of the flexible supporting element 3. The end cap 1 also includes at least one means 7 for locking the end portion 6 of the flexible supporting element 3 in an engaged position in the housing 5 once same has been engaged in the housing 5. This locking occurs by cooperation between the locking means 7 and a cavity 17 formed in or on the flexible supporting element 3.

The end cap 1 includes a securing device 18 for the locking means 7 whose function is to restrict the possibility of accidental switching of the locking means 7.

According to one step of the method, the end cap 1 is slipped onto the end portion 6 of the flexible supporting element 3. Innovatively, the component 24 is stressed longitudinally to cause the securing device 18, notably the element 9, to enter the cavity 17. The stressing step is made possible for example using the operating clearances and manufacturing tolerances of the component or components 24, or by deforming same in particular in the longitudinal direction of the wiper 2. This enables the element 9 to enter the cavity 17 and to be positioned on the face 11 of the flexible supporting element 3. The elasticity of the component, in particular the air deflector or air deflectors 26, guarantees a force that presses the portion 8 against a section 38 of the cavity 17, thereby guaranteeing the correct positioning of the securing device 18 on the flexible supporting element 3.

According to a second assembly method, which may replace the first assembly method or be combined with same as a supplementary step in the first method, the wiper described above undergoes a step in which the end cap 1 is slipped onto the end portion 6 of the flexible supporting element 3 until the locking means 7 cooperate with a cavity 17 formed in the flexible supporting element 3. This second method involves deforming the securing device 18, in particular the leg 19, coming out of the body 30 of the end cap 1 until the securing device 18, notably the leg 19, is covering the locking means 7. This prevents access to the locking means, making it impossible to disassemble the wiper.

The invention claimed is:

1. An end cap for a wiper of a window of a vehicle including at least one flexible supporting element and a blade configured to be applied against the window, the end cap comprising:
   a housing designed to receive an end portion of the flexible supporting element;
   at least one means for locking the end portion of the flexible supporting element in an engaged position in the housing; and
   an outer wall delimiting the cap as well as an access orifice to the locking means, the locking means including:
      a portion able to form a longitudinal stop facing the flexible supporting element,
      a first face that extends between the housing and the outer wall,
      a second face opposite the first face, and
      an element that emerges at the junction between the first face and the portion and that extends at least longitudinally beyond the portion,
   wherein the second face is exposed to an opening of the access orifice and is closer to the access orifice than any other faces of the locking means, and
   wherein the first face and the second face are connected by a directly bevel.

2. The cap according to claim 1, in which the element forms an edge arranged to come into contact with at least one longitudinal face of the flexible supporting element.

3. The cap according to claim 2, in which the edge is delimited by a surface that is substantially perpendicular to a face of the portion.

4. The cap according to claim 1, in which the locking means include an elastic arm at the end of which are formed the portion and the element.

5. The cap according to claim 4, in which the elastic arm is moveable in rotation about an axis that intersects the housing and is perpendicular to a longitudinal direction of the end cap.

6. The cap according to claim 4, in which the locking means form an "L" shape in a plane substantially parallel to a plane in which most of the housing extends.

7. The cap according to claim 4, wherein the bevel is arranged on a side of the elastic arm.

8. The cap according to claim 1, wherein the flexible supporting element is an extension of the first face.

9. A wiper comprising:
   at least one flexible supporting element;
   a blade designed to be applied against a window; and
   one end cap having a housing designed to receive an end portion of the flexible supporting element,
   said end cap having at least one means for locking the end portion of the flexible supporting element in an engaged position in the housing by cooperation between the locking means and a cavity formed in the flexible supporting element,
   wherein the end cap further comprises a securing device for the locking means that prevents the locking means from coming out of the cavity, and
   wherein the locking means include an elastic arm at the end of which are formed a portion providing a longitudinal stop bearing against the inside of the cavity and the securing device.

10. The wiper according to claim 9, in which the securing device includes an element that comes into contact with at least one longitudinal face of the flexible supporting element, said longitudinal face being opposite an outer wall delimiting the end cap.

11. The wiper according to claim 10, in which the locking means include a first face that extends between the housing and the outer wall, a second face opposite an access orifice to the locking means and a portion forming a longitudinal stop bearing against the inside of the cavity, the element emerging from the junction between the first face and the portion and extending at least longitudinally beyond the portion.

12. The wiper according to claim 11, in which the element forms an edge delimited by a surface that is substantially perpendicular to a face of the portion.

13. The wiper according to claim 9, in which the elastic arm is moveable in rotation about an axis that extends substantially parallel to a plane in which most of the housing extends and perpendicular to a longitudinal direction of the end cap.

14. The wiper according to claim 9, in which the securing device includes at least one wall running alongside a peripheral edge of the locking means.

15. A system for wiping a window of a vehicle including an arm and a wiper according to claim 9.

* * * * *